Dec. 28, 1965 M. W. FORTH ETAL 3,225,711
WAFERING DIE
Filed Jan. 2, 1962 5 Sheets-Sheet 1

INVENTORS
M. W. FORTH
R. E. HARRINGTON

Dec. 28, 1965    M. W. FORTH ETAL    3,225,711
WAFERING DIE

Filed Jan. 2, 1962    5 Sheets-Sheet 2

INVENTORS
M. W. FORTH
R. E. HARRINGTON

Dec. 28, 1965  M. W. FORTH ETAL  3,225,711
WAFERING DIE
Filed Jan. 2, 1962  5 Sheets-Sheet 3

INVENTORS
M. W. FORTH
R. E. HARRINGTON

Dec. 28, 1965  M. W. FORTH ETAL  3,225,711
WAFERING DIE
Filed Jan. 2, 1962  5 Sheets-Sheet 4
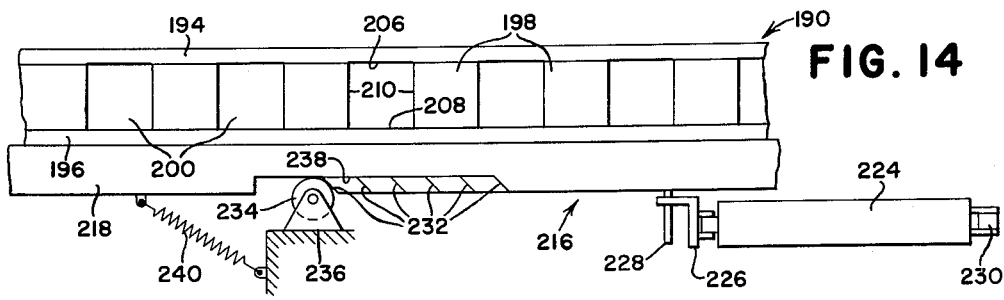
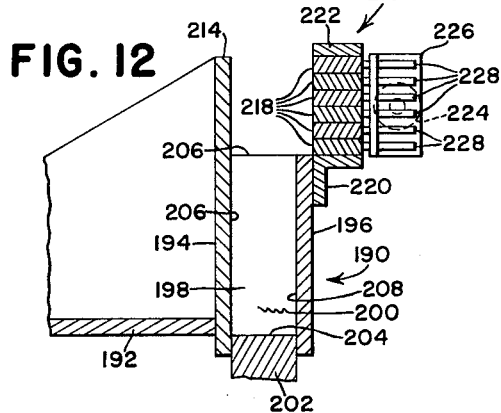
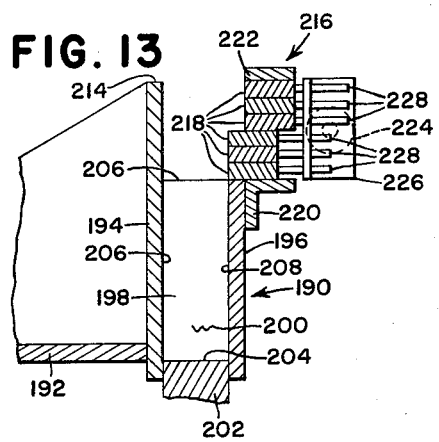
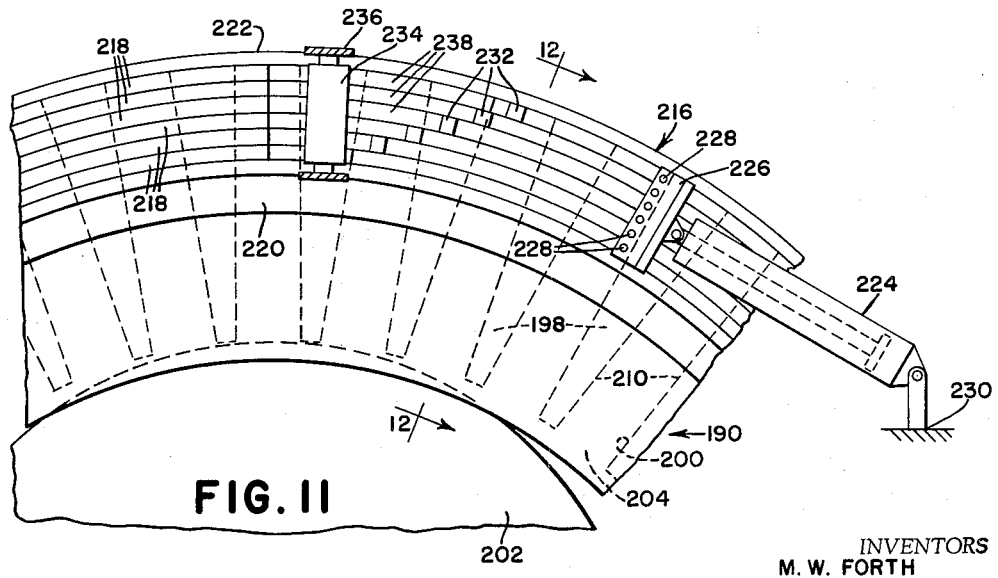
INVENTORS
M. W. FORTH
R. E. HARRINGTON Dec. 28, 1965  M. W. FORTH ETAL  3,225,711
WAFERING DIE
Filed Jan. 2, 1962  5 Sheets-Sheet 5
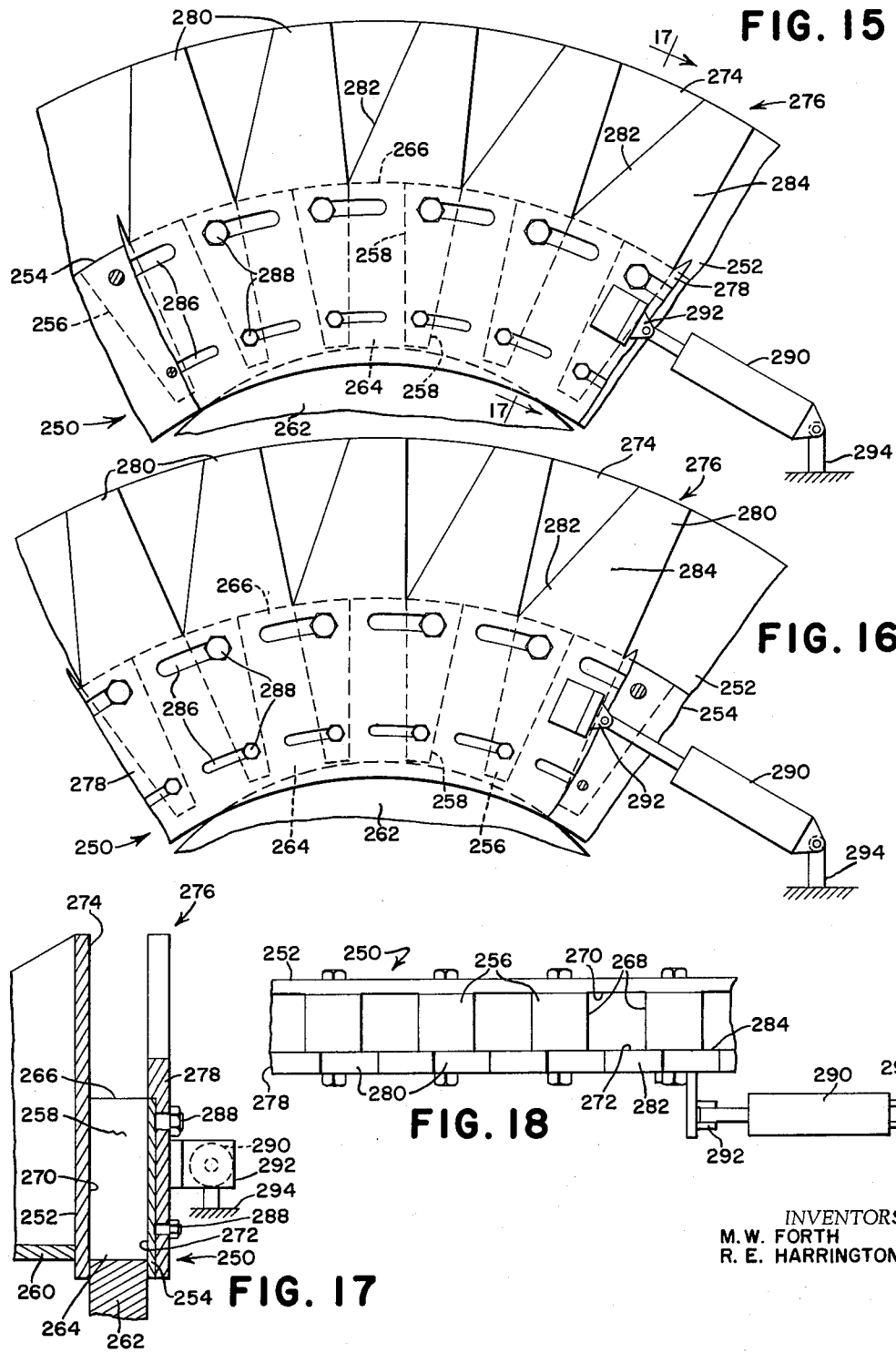
INVENTORS
M.W. FORTH
R. E. HARRINGTON United States Patent Office 3,225,711
Patented Dec. 28, 1965

1

3,225,711
WAFERING DIE
Murray W. Forth and Roy E. Harrington, Moline, Ill., assignors to Deere & Company, Moline, Ill., a corporation of Delaware
Filed Jan. 2, 1962, Ser. No. 163,408
15 Claims. (Cl. 107—14)

This invention relates to a wafering machine and more particularly to improved die structure and control therefor in which novel principles are exploited in means for regulating the resistances of the passage of material through one or more dies.

In a typical wafering machine for producing wafers or pellets of field forage crops such as hay, grasses, straw, etc., an annular die provided with a plurality of uniformly circumferentially spaced die openings is cooperative with one form or another of press means whereby accumulated material is compacted in and extruded through the die openings, to emerge therefrom as wafers or pellets, the size of which varies according to desires but normally exists on the basis of 2 x 2 inches in cross-section and of varying length, depending upon the time interval elapsing between emergence of the wafers and break-off thereof at the outlet ends of the dies. Conventionally, this dimension will also be two inches, so that the ultimate wafer is essentially in the form of a cube; although, not all wafering machines operate on these dimensional characteristics. On the other hand, as distinguished from the conventional agricultural baler, in which the bales are of relatively light density and run about 16 x 16 x 48 inches, the wafers are, as will be seen, quite dense, compact and small. The relative advantages of wafers or pellets over conventional bales are known to those versed in the art and need not be elaborated here, the brief reference to conventional bales being for purposes of orientation only.

Likewise, a wafering machine has certain structural and functional characteristics that are quite different from those involved in the well-known pellet mill which has heretofore been known to sucessfully handle pulverulent material of substantially uniform moisture content and wherein the annular die usually comprises a cast or forged ring having a plurality of die cells cast or broached therein and usually consisting of a plurality of circumferential rows. In a typical wafering machine, on the other hand, the die structure involves a single circumferential row of die cells wherein the annulus affording the die structure is made up of a pair of closely coaxially spaced apart side members having rigidly therebetween a plurality of uniformly circumferentially spaced die blocks or spacers which afford the like plurality of die cells. In the so-called pellet mill art there is little if any occasion to vary the sizes of the die cells and consequently to vary the density of the extrusion product, but this need exists to a relatively great extent in the wafering machine art, because of the differences in various characteristics of the material, such as moisture content, frictional characteristics, chemical change, etc., primarily since the wafering die is used as part of a mobile vehicle operative over a field of forage crops or similar material and consequently is called upon to wafer or pellet this material rather shortly after it is picked up. Experience has shown that this material will vary from field to field, from windrow to windrow and very often will vary even in the same windrow in a field. This is of course a characteristic of forage crops even when handled by a conventional baler but the problem is not so acute because the bale is of relatively low density.

Consequently, designers and builders of wafering machines are confronted with a problem of means for varying the enclosed taper of the die cells so as to vary the density of the material passing therethrough, which is an aid in producing wafers or pellets of substantially uniform weight, since relatively moist material need not be compacted so tightly as relatively dry material. For this purpose, conventional wafering machines have used many forms of "chokes" or means for restricting the die cells at their outlet ends and some of these, although proving relatively successful, leave much to be desired, because means for varying the enclosed tapers of such die cells involves complicated internal parts subject to damage by foreign objects and also subject to jamming by accumulation of material.

According to the present invention, these problems are eliminated by a novel approach to the situation which relies upon means for increasing the length of a die cell whereby to add increased resistance to that occurring interiorly of the die because of the frictional surfaces presented by the walls that make up the die cell. It is a further feature of the invention to embody this principle in an annular die structure having a plurality of die cells.

A significant object of the invention resides in several forms of construction in which, in an annular die, the additional resistance means is provided concentrically with the annlus and radially beyond the outlet ends of the die cells, the resistance means being capable of being moved from an offset or minimum position, affording substantially zero resistance to the passage of material, to a maximum position affording maximum additional resistance. A further object in this respect is to provide the additional resistance means in such manner that variable additional resistances may be added to that afforded intrinsically in the die cells themselves.

The foregoing and other important objects and desirable features inherent in and encompassed by the invention will become apparent as preferred embodiments are disclosed in detail in the ensuing description and accompanying sheets of drawings, the figures of which are described below.

FIG. 11 is a fragmentary side view of a modified form of the invention.

FIG. 12 is a section taken substantially on the line 12—12 of FIG. 11.

FIG. 13 is a section like FIG. 12 but showing the parts in different positions.

FIG. 14 is a fragmentary plan view of the structure shown in FIG. 11.

FIG. 15 is a view similar to FIG. 11 but showing a still further form of the invention.

FIG. 16 is similar to FIG. 15 but shows the parts shifted from the positions of FIG. 15.

FIG. 17 is a section on the line 17—17 of FIG. 15.

FIG. 18 is a partial plan of the structure shown in FIG. 15.

Figure 1:
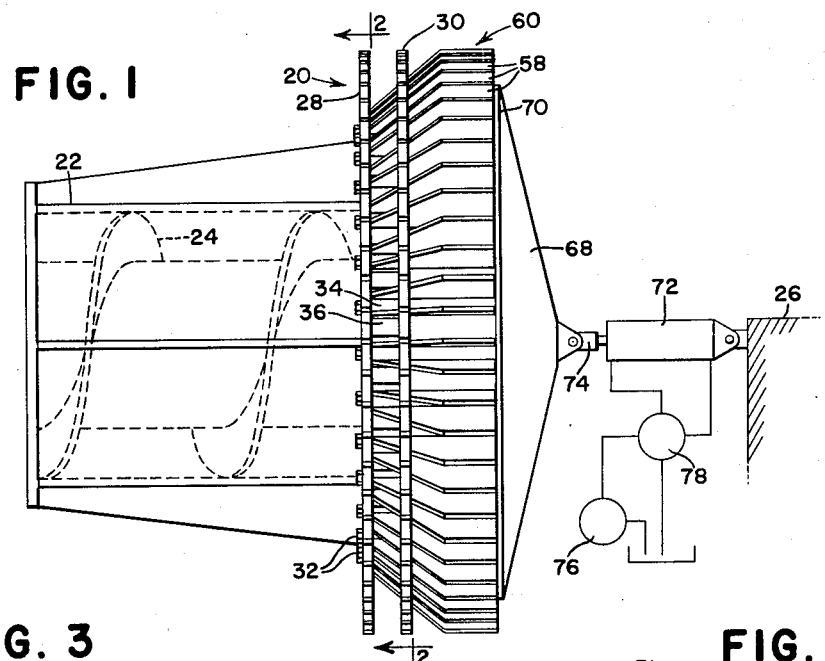
FIG. 1 is an elevational view, on a reduced scale, showing a typical installation involving one form of the invention.
Figure 2:
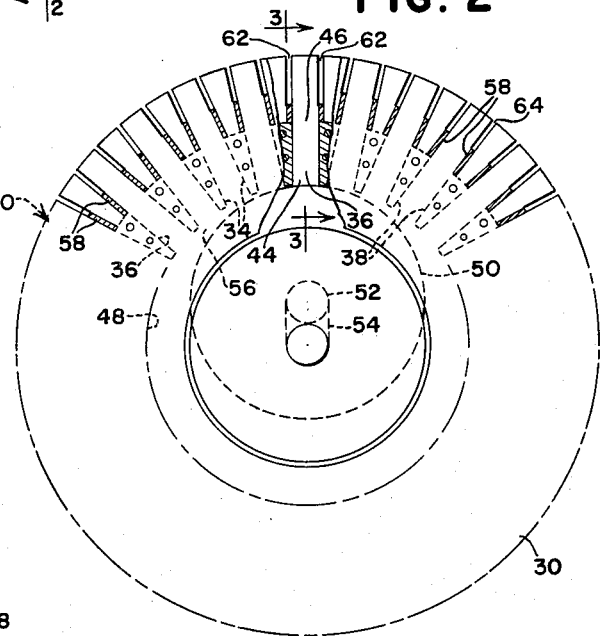
FIG. 2 is a fragmentary section, as seen generally along the staggered section line 2—2 in FIG. 1, with portions of the structure shown in dot-dash lines to avoid unnecessary duplication.

Reference will be had to FIGS. 1 and 2 by way of orientation. Die structure in the form of an annulus, indicated in its entirety by the numeral 20, is rigidly coaxially associated with a cylinder or tube 22 in which feed means, here in the form of an auger 24, feeds material axially to the interior of the annulus 20. The components 20 and 22, being rigidly secured together, may be regarded as support means or at least including support means, a portion of which is represented schematically at 26, it being understood that the whole is part of a basic machine, and preferably a mobile machine adapted to operate over a field of forage crops; although, the basic principles may be used in stationary machines.

The die annulus 20 is made up of a pair of coaxially closely spaced apart side members or rings 28 and 30, rigidly secured together in any suitable manner as by a plurality of bolts 32, which also serve to rigidly secure between the members 28 and 30 a plurality of uniformly circumferentially spaced general radial die blocks or spacers 34 which afford a like plurality of circumferentially spaced general radial die openings or cells 36. As best shown in FIG. 2, each die block or spacer 34 is of substantially wedge shape, having its smaller circumferential dimension radially inwardly and its larger dimension radially outwardly so that the circumferentially spaced apart side wall portions of each die cell, as at 38, are generally parallel. Each die cell is substantailly rectangular in cross-section and has its opposite walls—that is those that are axially spaced—formed of intervening portions of the side members 28 and 30, as at 40 and 42 in FIGS. 3 and 4. As thus disposed, each die cell has opposite inlet and outlet ends 44 and 46, respectively, and because of the annular nature of the structure, the inlets 44 afford an inner circumferential or peripheral row of openings and the outlet ends 46 likewise lie in another but concentric peripheral or circumferential row. In the preferred construction illustrated, the circumferential row at which lie the inlet ends 44 of the die cells 36 affords an internal annular track 48 around which compressor means operates to handle the material fed from the auger 24 so as to force this material radially outwardly through the die cells. The compressor means in this case may take the form of a circular press wheel 50 journaled at 52 on the throw of a crank shaft 54 which is journaled coaxially with the auger and annulus. Therefore, as the crank shaft turns about its own axis, which is also the axis of the auger and the annulus, the press wheel will orbit or run in planetary fashion, with its periphery running about the track 48 established by the inner ends of the spacers or die blocks as intervening between the inlet ends of the die cells 36. In the present case, the direction of orbit of the press wheel will be counterclockwise as seen in FIG. 2, it being noted that there is a crescent-shaped space 56 ahead of the press wheel and into which the material is fed from the auger housing or casing 22. As the wheel rolls around the track, this material is compacted successively into the die cells and ultimately the material is built up to such an extent that it is extruded radially outwardly through the die cells to emerge therefrom as wafers or pellets. It will be understood that pressures involved are substantially high and therefore the material is caused to compact and adhere together in wafer or pellet form.

From the description thus far, it will be seen that the mode of operation is such that the material is forced radially outwardly and successively through the die cells 36, which is a characteristic of the fact that the press wheel 50 runs on the interior track 48. Were the track to be considered as existing on the outer periphery of the annulus, or at the circumferential row of die cell outlets 46, in which case the outlets would become inlets and the inlets would become outlets, the pressure means would ride on that track and the material would be extruded radially inwardly. Such structures are, of course, not unknown. Hence, the particular direction of radial movement is not a limitation in the present case, the construction shown being illustrated because it is relatively familiar, in its basic nature, to those versed in the art. Likewise, in the present case, the annulus 20 is fixed and the press wheel 50 rotates as well as orbiting. Here again, variations are known in which the press wheel is held against orbiting but is allowed to rotate, and the annulus itself is rotated about its axis. In some instances, both orbiting and dual rotation are also involved. Nevertheless, the factors presented in the passage of the material through the die cells are not materially altered.

Another observation might be made, and that is that each die cell is here of rectangular cross section, preferably square, on the order of 2 x 2 inches. On the other hand, several other types of wall portions could be related to afford a die cell having a different cross-sectional shape, but in the interests of convenience in design, manufacture and use, the "square" die cell is preferred. Thus, the present disclosure is again based on known environments, with the recognition of variables not material here.

The starting point for the novel principle exploited here is acceptance of the fact that the density of the ultimate wafer emerging from a die cell is a function of its rate of progress through the die cell as it moves along the straight-line path indicated, here radially, which is in turn a function of the resistances encountered by the material. In large part, these resistances may be considered as existing because of the frictional characteristics between the material and the surfaces of the walls in the die cell, namely, the walls 38, 40 and 42. These resistances will in turn involve certain characteristics of the material, such as its moisture content, surface coating and the like, it being clear that relatively dry slippery material will involve lower resistances than heavier, more moist material. Therefore, without more, wafers could emerge which will vary materially in density and this variation will create problems in handling, storage, feeding, sale and etc. Consequently, it is desirable to provide some form of means for regulating the passage of material through a die cell, relative to its ultimate density characteristics, so that wafers of uniform density will be produced. A measure of success has been achieved in the past by providing means for restricting or narrowing the cross-sectional area of the die cell adjacent to its discharge end, which is readily accomplished in one known form by "choking" the discharge or outlet end by providing one of the walls, such as a wall 42 here, as a member which may be displaced inwardly relative to its opening fixed wall 42, or vice versa. However, according to the present invention, this principle is departed from and an entirely new principle is exploited, which involves, basically, adding length to each die cell which in turn adds resistance to that already established by the interior walls of that cell. As a practical matter, the additional resistance is furnished at the outlet ends of the cells.

In that form of the invention illustrated in FIGS. 1–4, the additional resistance means comprises a plurality of plate-like elements 58, arranged in a circumferential set to represent the additional means, designated in its entirety by the numeral 60. As representative of means for mounting these elements, the side members 28 and 30 are shown as being extended radially beyond the row of outlet ends 46 of the die cells 36 and provided with uniformly circumferentially spaced slots 62 and 64, respectively. In the present case, there are two elements 58 for each die cell, one providing what may be regarded as a radial extension or prolongation of each of the walls 38. As will be noted, each wall 38 lies in a plane that is parallel to a diametral plane which of course intersects the axis of the annulus. In short, the plane of each wall 38 is parallel to the axis and these planes are of course circumferentially spaced. This is a function of the fact that in this case the walls 38 are parallel and do not, therefore, lie on diameters of the annulus. It follows, therefore, that the slots 62, 64 lie generally in the same planes so as to carry the elements 58 respectively in the same planes.

Figure 3:
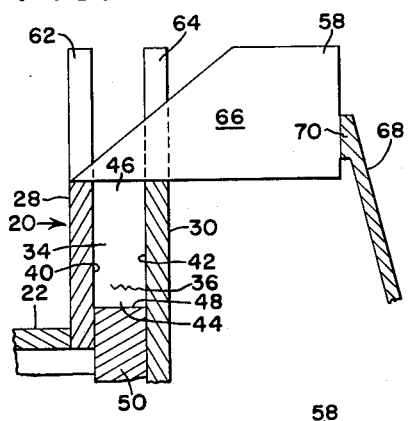
FIG. 3 is an enlarged section as seen along the line 3—3 of FIG. 2, illustrating part of the additional resistance means in a low-additional-resistance position.
Figure 4:
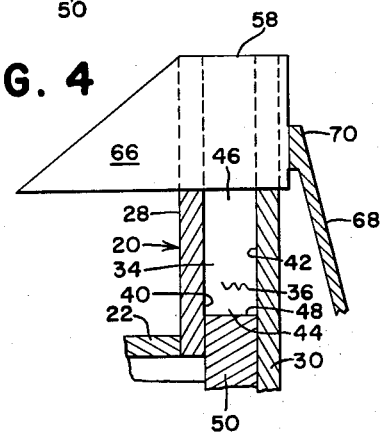
FIG. 4 is a view similar to FIG. 3 but showing the additional resistance means in its maximum-additional-resistance position.

Now, regarding only the walls 38 as those presenting the frictional resistances to passage of material (although, of course, the other walls 40 and 42 will also provide frictional resistances), it will be seen that if the length of each wall 38, or even one of the walls, is extended, the frictional resistance of that wall will be added to, which is the function of the proximate surface portions of the elements 58. That is to say, and comparing FIGS. 3 and 4, and noting that the element 58 is generally of triangular shape, at least in its surface portion 66, it will be seen that there is more of the area 66 presented beyond the die cell outlet 46 in FIG. 4 than there is in FIG. 3. In other words, the resistance to material passing through the die cell 36 in FIG. 3, is represented, in part, by the resistance set up by a wall 38 plus the resistance set up by the relatively small triangular prolongation or extension set up by the area 66 of the plate or element 58 immediately radially beyond the outlet end 46. In FIG. 4, this resistance is materially increased, because the full area of the element 58 is added as a prolongation of the surface 38. Considering the fact that, in the present case, there are two elements 58 for each cell 36, the resistances respectively referred to above are doubled.

Referring again to FIGS. 3 and 4, it should be noted that the latter presents what may be regarded as a maximum-additional-resistance position; FIG. 3 represents an intermediate position. In a minimum position, the entire set or group 60 of elements 58 would be fully retracted in an axial direction toward the right as seen in FIG. 1 so that the added resistance at each die cell would be zero or substantially so. If desired, the FIG. 3 position could be regarded as the minimum or zero position, taking into account the small triangular area there presented as part of the original resistance to passage of the material therethrough. In other words, the small triangular portion on each element could be regarded as part of the outlet end of the die cell.

Having regard to the foregoing as establishing the retracted position of the set of additional resistance means 60, it remains only to explain how the separate elements 58 are interconnected for axial shifting in unison to the maximum position (FIG. 4). As representative of such means, there is disclosed a conical plate 68 coaxial with the annular set of elements 58 and having its marginal flange rigidly secured, for example as at 70, to the circumferentially arranged elements 58. Since the elements are carried in the slots 62, 64 of the annulus and since the elements are all interconnected by the cone 68, it follows that the entire unit 58–68 is axially shiftable back and forth between minimum and maximum positions. For the purpose of accomplishing this shifting or axial movement, power operated means is shown at 72, consisting of a cylinder connected between a support portion 26 and the cone 68. The cylinder is of course expansible and contractable to act via its piston rod, at 74, to cause movement of the unit 58–68. The cylinder may be of the two-way type and may be typically connected in a fluid circuit including a pump 76 and a control valve 78. These may be arranged to be remotely controlled, in the case of a mobile wafering machine, but these are mere extensions of the basic concept which may be readily made on the basis of what is disclosed here. At any rate, the operator of the machine, noting the density characteristics of the emerging wafers, can, via control of the valve 78, extend or retract the additional resistance means 60 accordingly, shifting same toward its maximum position when the density of the material should be increased. In view of the triangular shape of the area 66, the additional resistance is added in proportion to the amount of movement of the additional means toward its maximum position; of course, the reverse is true as the additional resistance means is retracted to its minimum or zero position.

In addition to the supporting of the elements 58 on the cone 68, further bearing or supporting portions could be provided as desired. These have been eliminated in the interests of clarity.

Figure 5:
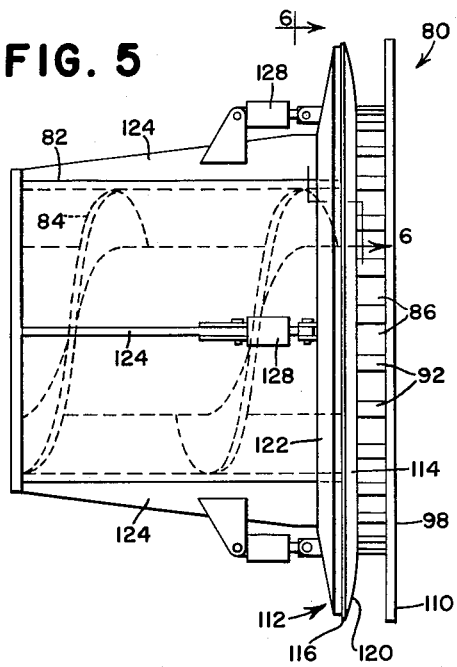
FIG. 5 is a view similar to FIG. 1 but showing a modified form of the invention.
Figure 7:
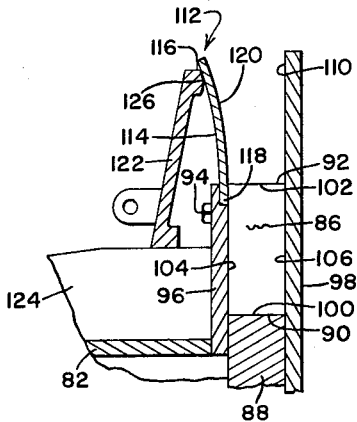
FIG. 7 is a section as seen along the line 7—7 of FIG. 6.
Figure 6:
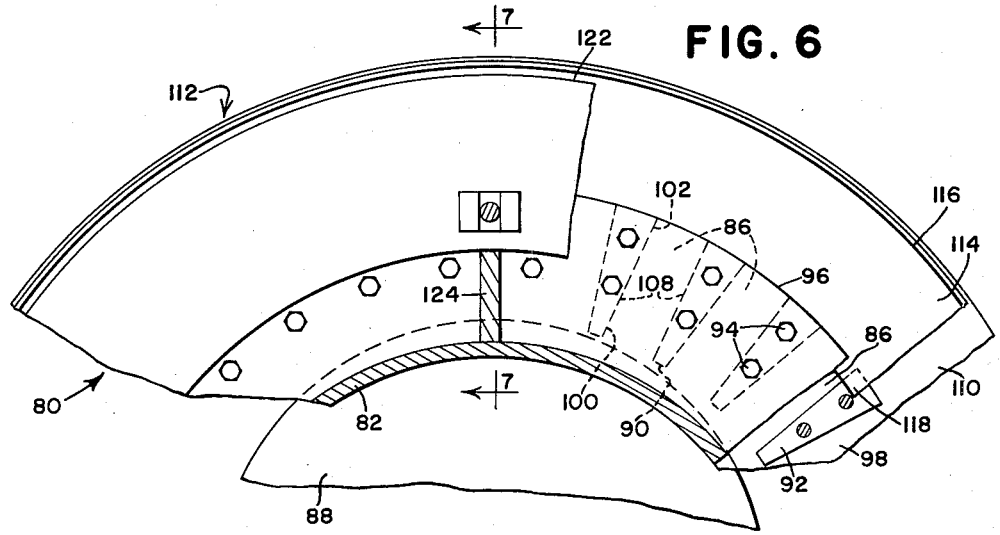
FIG. 6 is an enlarged fragmentary section taken generally along the staggered section line 6—6 in FIG. 5.

The modified form of the invention shown in FIGS. 5, 6 and 7 exploits the same principles in a somewhat different manner; although, there is still involved the prolongation or extension of at least one of the interior surfaces of the die cell. Although, fundamentally, the structures in FIGS. 5 through 7 are similar to those of FIGS. 1–4, different reference characters will be employed in the interests of clarity and better exposition.

Here, a die annulus 80 is rigidly connected coaxially to an auger tube or casing 82 in which an auger 84 feeds material to the interior of the annulus for extrusion radially outwardly through a plurality of die cells 86 via a press wheel 88, similar to that at 50 in FIGS. 1–4, which runs about the inner periphery or track 90 afforded in the annulus by the radially inner ends of a plurality of spacers or die blocks 92 which are rigidly secured as by bolts 94 between a pair of side members 96 and 98, the basic structure in this respect following that of FIGS. 1–4. Here again, the "geographical" aspects of the situation are the same as those discussed in connection with FIGS. 1–4; that is, the present disclosure is based upon the extrusion of material radially outwardly through the die cells, the material entering at inlet ends 100 and emerging as wafers at outlet ends 102 of the die cells, but, as previously described, the opposite could be true with known variations in the mode of operation.

The interior surfaces of the side members 96 and 98, as at 104 and 106, respectively, along with circumferentially opposed surfaces 108 of neighboring die blocks, will afford frictional resistance to the material moving radially outwardly. Hence, in a path measured along the length of the die cell, a frictional resistance of a certain magnitude will be established, depending again, of course, on the frictional characteristics of the material because of differences in moisture content, surface coating, etc. From what has been said above, in the discussion of FIGS. 1–4, it follows that prolongation of one or more of these surfaces will result in the addition of resistances to those existing or available in the die cell 86. In the present case, the side plate 98 is increased in diameter beyond the outlet end of each cell, as in the area 110, which corresponds generally to the increase in diameter of the side members 28 and 30 in FIGS. 1–4 so far as concerns that much thereof that mounts the elements 58. However, in FIGS. 5, 6 and 7, the frictional resistance afforded by the wall extension 110, which is a prolongation of the wall 106, may be regarded as part of the initial resistance existing in the die cell per se, and it is this resistance which will be added to by additional resistance means designated in its entirety by the numeral 112.

The additional means includes an annular member or ring 114 of plate-like nature having, of course, concentric peripheries 116 and 118. In the present case, the periphery 116 is the outer periphery and the periphery 118 is the inner periphery, which is a function of the construction in which the material is extruded radially outwardly. The inside diameter of the ring 114, which of course establishes the inner periphery 118, is such that the ring can be disposed in concentric relation to the annulus, surrounding the annulus at that portion thereof represented by the circumferential row of die cell outlets 102, and the ring is rigidly affixed to the annulus in this area along its marginal edge bordering the periphery 118, any suitable means being utilized, as an annular recess in the outer marginal edge of the side member 96, wherein the plate or ring 114 is installed before the blocks and other side member 98 are assembled. Judged in this condition, the ring 114 will of course have an annular portion intervening between the two peripheries 116 and 118, and this portion presents an annular continuous surface portion 120 which, broken down into circumferential sections, may be regarded as a plurality of circumferentially spaced apart portions, one for each die cell 86.

Now, having regard to the die cell surfaces 104 as the surfaces which are to be extended or prolonged by the additional resistance means 112, it will be noted that these surfaces 104 lie in a common radial plane normal to the axis of the annulus. It will be further seen that the marginal edge portion of the ring 114 bordering the circumferential row of die cell outlet ends 102 is coplanar with this common radial plane and, further, that the surface portion 120, in what may be regarded as the minimum or zero position of the resistance means, is directed axially away from this plane so that the periphery 116 is in axially offset relationship to that plane. Hence, in the minimum position of the resistance means (FIG. 7), the resistance to material passing through the die cell is simply that established by the interior surfaces of the die cell plus that at 110, it being recognized that the marginal portion of the ring 114 in the area of its periphery 118 is simply a part of the outlet end of each cell. It follows, then, that when it is desired to add to this resistance, portions of the surface 120 may be added to the respective walls 104 of the die cells as prolongations thereof, here radially outward prolongations.

The ring 114 is of resilient material of the type commonly employed in what is known as a "Belleville" spring and normally is biased to assume the position of FIG. 7. As means for actuating the ring to "spring" it toward a maximum position in which the surface 120 lies in or inwardly of the common radial plane in which lie the die cell surfaces 104, there is provided actuating means in the form of a ring 122 axially slidably but non-rotatably carried by a plurality of ribs 124 rigid on the auger casing 82. The control or actuator ring 122 has its peripheral flange portion contacting the ring 114 from behind and adjacent to its outer periphery 116, as in the area 126, and the control ring is operated by any suitable means, here in the form of a plurality of fluid motors 128 mounted on the ribs 124 in suitable fashion and acting on the ring 122. The motors are preferably fluid-connected in parallel so that they operate simultaneously with the result that the ring 114 is "sprung" inwardly uniformly about its annular extent, thus controlling all die cell outlets simultaneously.

By way of explanation, it should be noted that FIG. 6 is a section on the line 6—6 of FIG. 5, which is the reverse of the direction on which FIG. 2 is taken, and the press wheel in FIG. 6 will orbit in a clockwise direction. Fundamentally, however, the principles of the invention described in detail in connection with FIGS. 1–4 are present here; that is, additional resistances are added to those of the die cell by in effect increasing the length of each cell or the length of the path through which the material is moved.

Here, as in the case of FIGS. 1–4, any suitable means (not shown) may be utilized for causing the emerging material to break off transverse to its length, preferably on the order of a dimension that causes the wafer to become a cube. In many instances, the sheer length of the material extruded beyond the annulus will cause it to break off at the proper length because of its own weight. In other instances, some form of deflector may have to be provided. These details are, however, beyond the scope of the present invention and are not disclosed, since, basically, they are well known.

Figure 8:
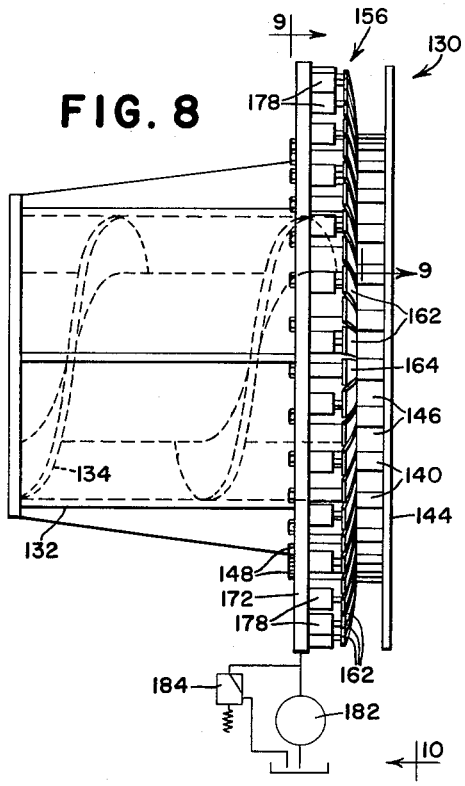
FIG. 8 is an elevation similar to FIGS. 1 and 5 but showing a further modified form of the invention.
Figure 10:
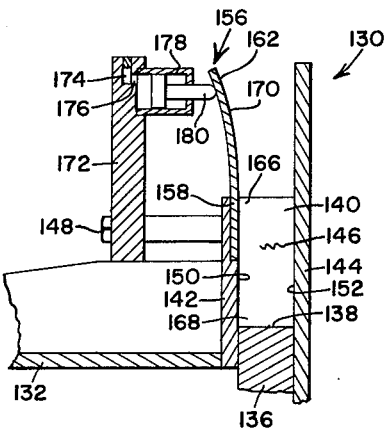
FIG. 10 is a section as seen generally along the line 10—10 of FIG. 9.
Figure 9:
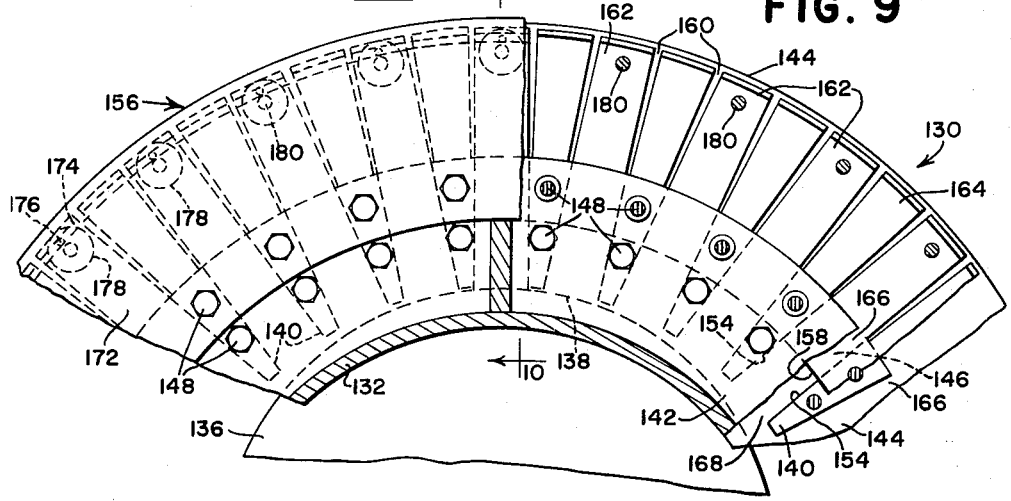
FIG. 9 is a section, on an enlarged scale, as seen along the staggered section line 9—9 of FIG. 8.

That form of the invention illustrated in FIGS. 8, 9 and 10 follows somewhat that shown in FIGS. 5, 6 and 7. Here again, despite the similarities separate reference characters will be employed.

The annulus, designated here at 130, is rigidly secured coaxially to an auger casing 132 in which is mounted a rotatable auger 134 for feeding material to the interior of the annulus. The same "geographical" observations made above apply in this instance; that is, the wafers formed herein result from the extrusion of material radially outwardly by means of a press wheel 136 which cooperates with an inner annular track 138 established by the radially innermost ends of a plurality of die blocks or spacers 140 which are uniformly circumferentially spaced apart between a pair of side members 142 and 144 to provide a like plurality of uniformly circumferentially spaced generally radial die cells or openings 146. Here again, bolts, such as those at 148, are used to rigidly secure the assembly 142–140–144 together, a well as other components, as will be explained. The arrangement of the die blocks and annular side members 142 and 144 again provide a rectangular arrangement of internal surfaces or walls, axially opposed portions 150 and 152 of the members 142 and 144 providing similarly axially opposed walls of the die cell 146 and circumferentially opposed surfaces of neighboring die blocks, as at 154, providing the other pair of walls for a die cell. Of course, this is circumferentially repeated about the annulus.

To the extent described, the situation is substantially identical to that that existed in FIGS. 5, 6 and 7 before the installation of the additional means 112. Proceeding from this, it will be seen that in FIGS. 8, 9 and 10 additional means, indicated in its entirety by the numeral 156, may be utilized to add length to the die cells and therefore to add resistance to that set up by the interior surfaces. Again using one of the interior surfaces as a starting point, the additional resistance is added to such surface in the case of each die cell. For present purposes, the surfaces 150 are selected, and these of course lie in a common radial plane normal to the axis of the annulus.

The resistance means in this case takes the form of a ring of the Belleville spring type as is the ring 114 in FIGS. 5, 6 and 7, except that in this case the inner radial marginal portion of the ring, as at 158 is left intact and the outer annular marginal portion is provided with a series of radial slits at 160 so as to provide the ring with a plurality of radial leaves 162, only every other one of which is significant, those intervening, as at 164 being without significance, except that they are left in place in the formation of the ring simply as a matter of convenience to avoid a further operation in cutting them out. Each leaf 162 extends radially outwardly from its associated die cell 146, the marginal portion 158 thereof being rigidly secured to the annulus in the area of the die cell outlet 166, it being clear that these outlets 166 lie in a circumferential row at the outer periphery of the annulus. Likewise, each die cell has its inlet end, as at 168, lying in a circumferential row at the inner periphery of the annulus, which is again a function of the mode of operation in which the wafered material is extruded radially outwardly rather than radially inwardly.

Each leaf 162 is in the area thereof proximate to the outlet 166 of the associated die cell 146 coplanar with the plane of the die cell interior surface 150 and, in the minimum position of the additional resistance means 156, the remainder of the leaf 162 is directed axially away from this plane. In other words, the axially inner surface 170 on each leaf adds substantially zero resistance to that already existing in the die cell 146. This is of course true completely about the annulus 130. In order to add resistance to the die cells, the leaves 162 are "sprung" inwardly so that the surface 170 becomes a prolongation of the respective surface 150.

In this instance, as distinguished from that in FIGS.

5, 6 and 7, individual movement of the leaves 162 may be accomplished for controlling the resistances selectively as to die cells, employing a system that is already known. This involves the rigid mounting in association with the annulus 130 of an annular manifold 172 having therein an annular manifold passage 174 in communication with which are a plurality of short passages 176, equal in number and circumferential spacing to the number and spacing of the leaves 162, which characteristics correspond to the number and spacing of the die cells 146. Rigidly secured to the inner face of the manifold ring 172 are a plurality of fluid cylinders 178, one for each leaf 162 and each in fluid communication via 176 with the manifold passage 174. Each cylinder 178 carries a piston having a piston rod 180 engaging the outer face of the associated leaf 162. Without more, were the fluid passage 173 pressurized, the motors 178 would be pressurized in parallel and all leaves 162 would move simultaneously inwardly to occupy their additional-resistance condition. However, in the present case, the fluid circuit which supplies the manifold passage 174, as via a pump 182, includes a relief valve 184 which is set at a predetermined maximum pressure which, when exceeded, results in the cessation of the application of pressure to the cylinders 178 beyond that at which the relief valve 184 is set. Hence, should the pressure in any particular die cell 146 rise to the setting of the relief valve 184, that pressure will be maintained, even though pressures in the other cells are not that high. That is to say, the cell with the least resistance therein will receive the maximum movement of its leaf 162. So far as concerns the application of the selective density control to wafering dies in general and in particular to control of the "choke" type, this is disclosed in assignee's copending application Ser. No. 66,874, filed November 2, 1960. This is referred to here as representative of means whereby the leaves 162 may be controlled by separate actuators, as represented by the motors 178, as distinguished from the unitary control of FIGS. 5, 6 and 7. In other respects, the additional resistance means 156 has the characteristics of those previously described. The manifold ring 172 is here shown as being attached to the annulus 130 by means of the bolts 148, previously described. This, however, is a detail that could be varied.

In FIGS. 11–14, the numeral 190 represents the arcuate section of an annulus which in general conforms to those previously described, at least as to general shape, function and association with means for feeding material thereto. A portion of such feeding means is shown at 192, which represents a portion of an auger housing similar to those previously described. The annulus here is made up of a pair of ring-like side members 194 and 196 and between these is rigidly disposed a plurality of uniformly circumferentially spaced generally radial die blocks or spacers 198 which, as in the cases before, provide a like plurality of generally radial die cells 200. The radially inner ends of the spacers or blocks 198 lie on the track or inner periphery over which a press wheel, as at 202, rides to extrude material radially outwardly, as in the circumstances previously described. The inlet end of each die cell, as at 204, will of course lie at the inner periphery of the annulus, and likewise the outlet end at 206 will be at the outer periphery. The inlet ends will be arranged in a circumferential row and the outer ends 206 will be in a concentric circumferential row. Opposed interior wall surfaces of the die cell, two of which are afforded by interior surfaces 206 and 208 of the side members 194 and 196, and the other two of which are provided by circumferentially opposed surfaces of neighboring blocks, as at 210, define the cell. Here again, the cross-sectional area of each die cell is "square" and of course the wafers produced thereby will have the same shape characteristic. Without more, the resistances to the passage of material radially outwardly through each die cell 200 are those set up by the interior surfaces or walls 206, 208, 210 and 210.

For present purposes, the wall 208 of each die cell 200 will be selected as the wall to which length is added. The opposite wall 194 is extended as at 214 to provide an opposing portion opposite to the additional means, here indicated in its entirety by the numeral 216, which here comprises an annulus of individual concentric rings 218, six in number in a preferred embodiment. These rings are arranged in inter-supported relationship so that each may have movement axially relative to its neighbor and the unit assembly is mounted concentrically on the annulus by inner and outer bearing rings 220 and 222, which may take any suitable form. The bearing rings may be regarded as part of the support which carries the annulus 190. The rings 218 are also mounted for relative angular movement. The additional means 216 is of course arranged in circumferentially surrounding relationship to the annulus 190 at the row of die cell outlets 206. In FIG. 14, the outer bearing ring 222 is omitted so as to show the construction and operation of the rings 218.

The principle of operation of the set of rings 218 is that, initially or in a minimum position, they are offset axially from the common radial plane in which the die cell surfaces 208 lie (FIG. 12), and thus in this minimum position do not add to the resistance encountered by the die cell as initially established. Increase in length of each die cell, having now regard to its surface 208, is accomplished by moving the rings sequentially into the plane just referred to. If a small amount of resistance is required, just the lowermost or radially innermost ring is moved in. Another increment of resistance can be added by moving the next outermost ring in and so on until all six are moved into the plane. FIG. 13 shows what may be regarded as an intermediate position, the innermost set of three rings having been moved in while the outermost set of three rings remains in its minimum position. Of course, the number of rings can be varied.

As previously stated, the rings 218 are mounted for angular as well as for axial movement. The principle of operation involves axial shifting as a component of angular movement and for this purpose the rings are controlled by an actuator, here in the form of a fluid motor 224 having its piston provided with a yoke 226 in which are a plurality of radially spaced apertures for respectively receiving radially spaced pins 228 carried respectively by the rings 218. The other end of the motor 224 may be connected to any suitable support, as at 230. The edges of the rings 218 which lie proximate to the radial plane of the die cell surfaces 208 represent surface portions which are added to the length of the interior surfaces 208. The opposite edges of the rings respectively have cams 232 thereon and these cooperate with a roller 234 carried on a fixed part of the support means, as at 236.

Let it be assumed that FIG. 14 represents what may be regarded as a starting position of the rings, so far as concerns both angular and axial movement. This position will correspond to that shown in FIG. 12. The cam 232 immediately in contact with the roller 234 represents the cam on the lowermost or radially innermost ring 218. If fluid pressure is supplied to the motor 224 to cause the yoke 226 to move to the left in a limited amount, all of the rings would move simultaneously, but only the radially innermost ring 218 will be cammed inwardly, since it is the only ring having its cam 232 in contact with the roller 234. Hence, only this ring will be shifted inwardly to the radial plane in which lie the interior surfaces 208 of the die cells. If the amount of added resistance is sufficient, the expansion of the motor 224 is discontinued. As the other rings advance to the left (as seen in FIG. 14) their axial position is not affected by the cam, since the roller 234 rides on a flat track portion 238, there being such portion of each ring in association with the cam 232. Therefore, the rings whose cams 232 do not engage the roller 234 simply move angularly but do not shift axially.

If continued fluid pressure is applied to the motor 224 so as to shift the ring assembly through another angular increment, the radially innermost ring 218 will retain its maximum position, since its straight track portion 238 will continue to ride along the roller 232, but the next radially outermost ring 218 (second from the bottom in FIG. 12) will now have its cam 232 engaged by the roller 234, whereupon this second ring will be shifted into the same radial plane as the innermost or first ring. Again, if the amount of added resistance is sufficient, the fluid motor is stopped. At this time, the cam 232 of the next outermost ring—the third ring from the bottom of FIG. 12—engages the roller 234. Therefore, if further expansion of the motor 224 is effected, the third ring will shift inwardly so that the innermost set of three rings occupy the position of FIG. 13, it being understood that previously shifted rings do not shift axially inwardly, since the roller is then riding on the track portions 238 thereof.

In the condition of FIG. 13, substantially half of the available resistance has been added. Further increments of resistance may be added by sequentially shifting the fourth, fifth and sixth rings into the radial plane of the surface 208 in the manner just described, again it being clear that the previously shifted rings do not advance axially inwardly, since their track portions 238 ride on the roller. The connection of the pins 228 of the rings 218 to the yoke 226 is such that the motor 224 may remain in its position and the pins 228 will slide in the apertures in the yoke. The motor 224 is preferably of the two-way type so that it may be retracted to sequentially return the rings to intermediate positions and ultimately to the minimum position of FIG. 12. For the purpose of causing the rings to assume their original positions, a plurality of springs, as at 240, may be connected between the support 236 and the rings to impart a returning bias to the rings.

As in the instances previously described, the basic principle of adding to the length of the die cells is exploited by a construction in which incremental amounts of additional resistance are available. Also, as in the previous instances, the principles may be applied to a die structure having single or multiple cells arranged other than as described.

In the form of the invention shown in FIGS. 15–18, the die annulus is indicated in its entirety by the numeral 250 as being made up of annular side members 252 and 254 between which is a circumferential set of die blocks 256 forming a plurality of uniformly circumferentially spaced generally radial die cells 258, the construction in this respect following those previously described. In FIG. 17, a portion of an auger tube will be recognized at 260 for feeding material to the inner annular track of the annulus for extrusion through the die cells 258 via a press wheel 262. The inlet and outlet ends of the die cells are as before, but for purposes of identification they are designated here by the numerals 264 and 266 respectively. In the case of each die cell, there are four internal walls, two of which are circumferentially opposed and are made up of opposed faces of neighboring blocks 256, as at 268, and the other two of which, at 270 and 272, are intervening portions of the opposed side members 252 and 254. The side member 252 is radially extended beyond the outlet end 266 of each die cell, as at 274, but again this is simply a fixed extension and may be regarded as part of the outlet end of the die, at least to the extent that resistance characteristics, whenever operating alone, are present even though the additional means, here identified in its entirety by the numeral 276, is not operative.

The means 276 comprises in this instance an annular plate-like member 278 having its outer periphery of somewhat saw-tooth construction to provide a plurality of radial generally triangularly shaped extensions or fingers 280. The continuous or inner marginal peripheral portion of the member 278 closely overlies the wall 254, and the means for securing the assembly together is here used as means for mounting the member.

In the present case, the added resistance is furnished in connection with extending or prolonging the interior wall 272 of the cell 256. In considering these cells 256 as lying in a circumferential or annular row, it will be noted that the interior surfaces 272 lie in a common radial plane normal to the axis of the annulus. The interior surface portions provided on the insides of the fingers 280 of the additional means 276 lie also in this plane but in a minimum or starting position are angularly offset. In the present case, the angular offset is in a clockwise direction (FIG. 15). That is to say, only a relatively small portion, as at 282, provides a radial extension of the associated die cells 258 at the outlet ends 266 thereof. However, when the means 276 is shifted circumferentially to its maximum position (FIG. 16) the relatively minor portion 282 of each finger 280 moves angularly into radial registration with the next die block 256 and a major portion 284 of the finger becomes radially alined with the interior surface 272. Hence, the difference in added resistance is that between the areas of 282 and 284. Stated otherwise, in FIG. 15, the added resistance comes from a triangular portion of the finger 280 and in FIG. 16 the added resistance comes from a rectangular portion which, as will be seen, has substantially twice the area of the triangular portion. Thus, the resistance in effect is doubled, other things being equal.

For the purpose of mounting the means 276 for circumferential shifting within the limits noted, the member 278 is provided with a plurality of arcuate slots 286 which receive bolts 288 employed to interconnect the assembly. Any other form of construction could be used. Likewise the representative means for shifting the member 278 between its FIGS. 15 and 16 positions, here a fluid motor 290 acting on the member 278 at 292 and reacting on a suitable support as at 294, could be replaced by equivalent means. On the basis of the discussion above in connection with the other forms of the invention, the advantages, purposes, functions, etc. of this invention will be clear without elaboration.

In all forms of the invention, the principle of extending the length of the die cell or of adding resistance thereto beyond the original resistance, as distinguished from "choking" one end of the cell, is exploited. The various forms of the invention will suggest other ways of accomplishing the same result. Features and advantages not categorically enumerated will readily occur to those versed in the art, all without departing from the spirit and scope of the invention.

What is claimed is:

1. Die structure for a wafering machine, comprising: support means including an annulus having a pair of closely coaxially spaced apart ring-like side members and a plurality of uniformly circumferentially spaced generally radial spacers rigid with and interposed between the members and providing a like plurality of generally radial die cells having inlet and outlet ends arranged respectively in concentric circumferential rows, said inlet ends being adapted to receive material for radial passage through the cells to emerge as wafers at said outlet ends and said cells respectively having interior radial surfaces terminating at said outlet ends to afford frictional resistance to the passage of such material; additional resistance means arranged concentrically adjacent to the row of outlet ends of the cells and having frictional surface portions equal in number and circumferential spacing to the cells; means mounting said additional resistance means on the support means for movement between a minimum position in which said surface portions are respectively offset from and exteriorly of the aforesaid surfaces of the die cells and generally clear of emerging wafers and a maximum position in which said surface portions lie respectively in parallelism with the line of material passage and in radial register with said die cell surfaces and radially beyond said outlet ends so as to present radial extensions of said die cell surfaces for frictional contact with the emerging wafers while retaining the cross-sectional areas of the respective cells; and means operatively connected between said additional resistance means and the support means for moving said surface portions between said positions.

2. The invention defined in claim 1, in which: said surface portions are of progressively increasing radial dimension so as to present progressively increasing additional resistances to the wafers when moved progressively to its maximum position.

3. The invention defined in claim 1, in which: said additional means includes a plurality of plate-like elements, each having one of said surface portions at one face thereof, and each element disposed, in said minimum position, with its surface portion axially offset from its associated die cell surface, all of said elements being axially offset in the same direction and lying in a circumferential row, and said elements are interconnected for movement in unison axially toward and away from said maximum position.

4. The invention defined in claim 3, in which: the die cell interior surfaces lie respectively generally in circumferentially spaced planes parallel to the axis of the annulus; and said element surface portions lie respectively in and are movable in said planes.

5. The invention defined in claim 4, in which: each element is of generally triangular shape in its plane so that the surface portion thereof increases in area in the direction toward which said set is axially offset, whereby, upon movement of said elements progressively toward said maximum position, progressively increasing areas of said surface portions become, respectively, radial extensions of said die cell surfaces.

6. The invention defined in claim 4, in which: the side members of the annulus are provided with radial slots respectively in said planes and respectively carrying said elements.

7. The invention defined in claim 1, in which: the die cell interior surfaces aforesaid lie in a common radial plane; said additional means includes a plurality of plate-like elements, each having one of said surface portions at one face thereof, and each element disposed, in said minimum position, with its surface portion lying in said plane but circumferentially offset from its associated die cell surface; all of said elements are uniformly circumferentially offset from the die cells in the same direction; and said elements are interconnected for movement circumferentially in unison between said minimum and maximum positions.

8. The invention defined in claim 7, in which: each element is of generally triangular shape in said plane so that the surface portion thereof increases in area in the direction toward which said element is circumferentially offset, whereby, upon movement of said elements progressively toward said maximum position, progressively increasing areas of said surface portions become, respectively, radial extensions of said die cell surfaces.

9. The invention defined in claim 1, in which: said additional resistance means includes a plurality of resilient leaves, each having radially opposite ends and an inner face providing one of said surface portions, each element being attached at one end to the annulus in radial register with a die cell interior surface at the outlet end of an associated die cell and, in said minimum position, having the remainder thereof extending radially beyond said outlet end and directed laterally away from said die cell interior surface to provide said offset of said surface portion relative to said die cell interior surface, and said leaves being all offset in the same direction and being interconnected for movement in unison to said maximum position.

10. The invention defined in claim 1, in which: said additional resistance means includes a plurality of resilient leaves, each having radially opposite ends and an inner face providing one of said surface portions, each element being attached at one end to the annulus in radial register with a die cell interior surface at the outlet end of an associated die cell and, in said minimum position, having the remainder thereof extending radially beyond said outlet end and directed laterally away from said die cell interior surface to provide said offset of said surface portion relative to said die cell interior surface, and the means for moving said additional resistance means includes a plurality of actuators, one for and operative on each leaf.

11. The invention defined in claim 1, in which: said additional resistance means comprises a continuous ring means having an annular radial face concentric with and, in said minimum position, offset axially from said row of outlets, said face including said surface portions, and said interior surfaces of the die cells at their outlet ends lie in a common radial plane from which said ring means face is axially offset in said minimum position and to which said ring means face is moved in said maximum position.

12. The invention defined in claim 11, in which: said ring means includes a plurality of mutually inter-supported rings, respectively having annular radial face portions making up said radial face, said rings being relative axially shiftable sequentially to said maximum position for additive presentation of one or more of said face portions as additional resistances for said die cell surface portions.

13. The invention defined in claim 1, in which: said surfaces of the die cells lie in a common radial plane normal to the axis of the annulus, and the additional resistance means includes a radial ring of plate-like nature concentric with the annulus and having inner and outer peripheries, one of said peripheries encircling the annulus at the outlet ends of the openings and lying generally in the common plane of said surfaces and the other periphery being spaced radially from said first periphery said ring being of yieldable material and having its annular portion between said peripheries displaced axially away from said common plane, in said minimum position, said annular portion including the aforesaid surface portions, means fixing the ring at said one periphery to the annulus and said annular portion being shiftable axially to carry said surface portions to said maximum position.

14. Die structure for a wafering machine, comprising: support means including a plurality of related wall portions defining a die cell of predetermined length and cross-section and having inlet and outlet ends spaced along a material path lengthwise of said cell and through which material moves from said inlet end to said outlet end to emerge at the latter as wafers; said wall portions having interior surfaces affording frictional resistance to the passage of material through said cell; and means for increasing the length of the path traveled by the material while retaining the cross-sectional area of said outlet end, including a normally retracted element exteriorly of the cell and having a frictional surface portion, means mounting said element on the support means for movement from a retracted position, in which said surface portion has substantially negligible additive effect on cell resistance, to a resistance position in which said surface portion is presented to the outlet end of the die cell substantially parallel to the material path and as a prolongation of at least one interior surface of said cell, and means for moving said element betwen its retracted and resistance positions.

15. Die structure for a wafering machine, comprising: support means including a plurality of related wall portions defining a die cell of predetermined length and cross-section and having inlet and outlet ends spaced along a material path lengthwise of said cell and through which material moves from said inlet end to said outlet end to emerge at the latter as wafers; said wall portions having interior surfaces affording frictional resistance to the passage of material through said cell; and means for increasing the length of the path traveled by the material while retaining the cross-sectional area of said outlet end, including a normally retracted element exteriorly of the cell and having a frictional surface portion, means mounting said element on the support means for movement from a retracted position, in which said surface portion has substantially negligible additive effect on cell resistance, to a resistance position in which said surface portion is presented to the outlet end of the die cell substantially parallel to the material path and as a prolongation of fewer than all interior surfaces of said cell, and means for moving said element between its retracted and resistance positions.

References Cited by the Examiner

UNITED STATES PATENTS

| | | | |
|---|---|---|---|
| 751,752 | 2/1904 | Pilliod. | |
| 1,252,821 | 1/1918 | Lewis | 18—12 |
| 2,148,003 | 2/1939 | Wurtzel. | |
| 2,799,046 | 7/1957 | Rossin | 18—12 |
| 2,902,949 | 9/1959 | Meakin. | |
| 2,958,900 | 11/1960 | Meakin | 107—14 XR |

FOREIGN PATENTS

| | | |
|---|---|---|
| 504,019 | 6/1951 | Belgium. |
| 187,858 | 7/1907 | Germany. |
| 322,577 | 7/1920 | Germany. |

WALTER A. SCHEEL, *Primary Examiner.*

JOSEPH D. SEERS, *Examiner.*